(12) United States Patent
Cho et al.

(10) Patent No.: US 12,158,842 B2
(45) Date of Patent: Dec. 3, 2024

(54) DATA CO-LOCATION USING ADDRESS HASHING FOR HIGH-PERFORMANCE PROCESSING IN MEMORY

(71) Applicant: ADVANCED MICRO DEVICES, INC., Santa Clara, CA (US)

(72) Inventors: Benjamin Youngjae Cho, Austin, TX (US); Armand Bahram Behroozi, Ypsilanti, MI (US); Michael L. Chu, Santa Clara, CA (US); Ashwin Aji, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/956,995

(22) Filed: Sep. 30, 2022

(65) Prior Publication Data

US 2024/0111672 A1     Apr. 4, 2024

(51) Int. Cl.
    *G06F 12/02*             (2006.01)
    *G06F 12/06*             (2006.01)

(52) U.S. Cl.
    CPC ...... *G06F 12/0607* (2013.01); *G06F 12/0223* (2013.01); *G06F 2212/1024* (2013.01)

(58) Field of Classification Search
    CPC ...... G06F 12/06; G06F 12/02; G06F 12/0223; G06F 2212/1024; G06F 2212/1027; G06F 12/0607
See application file for complete search history.

(56) References Cited

U.S. PATENT DOCUMENTS

| | | | | |
|---|---|---|---|---|
| 7,620,793 | B1 * | 11/2009 | Edmondson | ........ G06F 12/0607 |
| | | | | 711/208 |
| 7,698,621 | B2 * | 4/2010 | Choi | ................ H03M 13/2792 |
| | | | | 714/776 |

(Continued)

FOREIGN PATENT DOCUMENTS

| | | | | |
|---|---|---|---|---|
| EP | | 2354952 A1 * | 8/2011 | ......... G06F 12/0607 |
| WO | WO-2006057949 A2 * | | 6/2006 | ......... G06F 12/0607 |
| WO | WO-2008133415 A1 * | | 11/2008 | ........ H03M 13/2707 |

OTHER PUBLICATIONS

Cho, Benjamin Y., Yongkee Kwon, Sangkug Lym, and Mattan Erez. "Near data acceleration with concurrent host access." In 2020 ACM/IEEE 47th Annual International Symposium on Computer Architecture (ISCA), pp. 818-831. IEEE, 2020. DOI:10.1109/ISCA45697.2020.00072.

*Primary Examiner* — Pierre Michel Bataille

(57) ABSTRACT

A processing system allocates memory to co-locate input and output operands for operations for processing in memory (PIM) execution in the same PIM-local memory while exploiting row-buffer locality and complying with conventional memory abstraction. The processing system identifies as "super rows" virtual rows that span all the banks of a memory device. Each super row has a different bank-interleaving pattern, referred to as a "color". A group of contiguous super rows that has the same PIM-interleaving pattern is referred to as a "color group". The processing system assigns memory addresses to each operand (e.g., vector) of an operation for PIM execution to a super row having a different color within the same color group to co-locate the operands for each PIM execution unit and uses address hashing to alternate between banks assigned to elements of a first operand and elements of a second operand of the operation.

20 Claims, 8 Drawing Sheets

(56) References Cited

U.S. PATENT DOCUMENTS

| | | | | |
|---|---|---|---|---|
| 7,805,587 B1* | 9/2010 | Van Dyke | ........... | G06F 12/0607 |
| | | | | 711/6 |
| 2010/0138587 A1* | 6/2010 | Hutson | ............... | G06F 12/0607 |
| | | | | 711/E12.001 |
| 2010/0309969 A1* | 12/2010 | Kim | ...................... | H04L 1/0041 |
| | | | | 375/232 |
| 2012/0106662 A1* | 5/2012 | Miyazaki | ............... | H04L 1/0071 |
| | | | | 375/259 |
| 2014/0310232 A1* | 10/2014 | Plattner | ............. | G06F 16/24539 |
| | | | | 707/602 |
| 2019/0181884 A1* | 6/2019 | Sun | ...................... | H03M 13/353 |
| 2019/0334585 A1* | 10/2019 | Lee | ...................... | H04L 5/0023 |
| 2021/0303355 A1* | 9/2021 | Nag | .................... | G06F 12/0607 |
| 2023/0141902 A1* | 5/2023 | Ma | .................... | G06F 16/24524 |
| | | | | 707/718 |

\* cited by examiner

DATA CO-LOCATION USING ADDRESS HASHING FOR HIGH-PERFORMANCE PROCESSING IN MEMORY

BACKGROUND

Computing systems often include a number of processing resources, such as processors or processor cores, which can retrieve instructions, execute instructions, and store the results of executed instructions to memory. A processing resource can include a number of execution units such as arithmetic logic units (ALUs), floating point units (FPUs), and combinatorial logic blocks, among others. Typically, such execution units are local to the processing resources. That is, execution units tend to be implemented as part of a processor and are separate from memory devices in which data to be operated upon is retrieved and data forming the results of operations is stored. Such data can be accessed via a bus between the processing resources and memory.

Processing performance can be improved by offloading operations that would normally be executed in the execution units to a processing-in-memory (PIM) device. PIM refers to an integration of compute and memory for execution of instructions that would otherwise be executed by a computer system's primary processor or processor cores. However, a naive data layout can result in row buffer conflicts that negatively impact the performance improvements offered by PIM.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
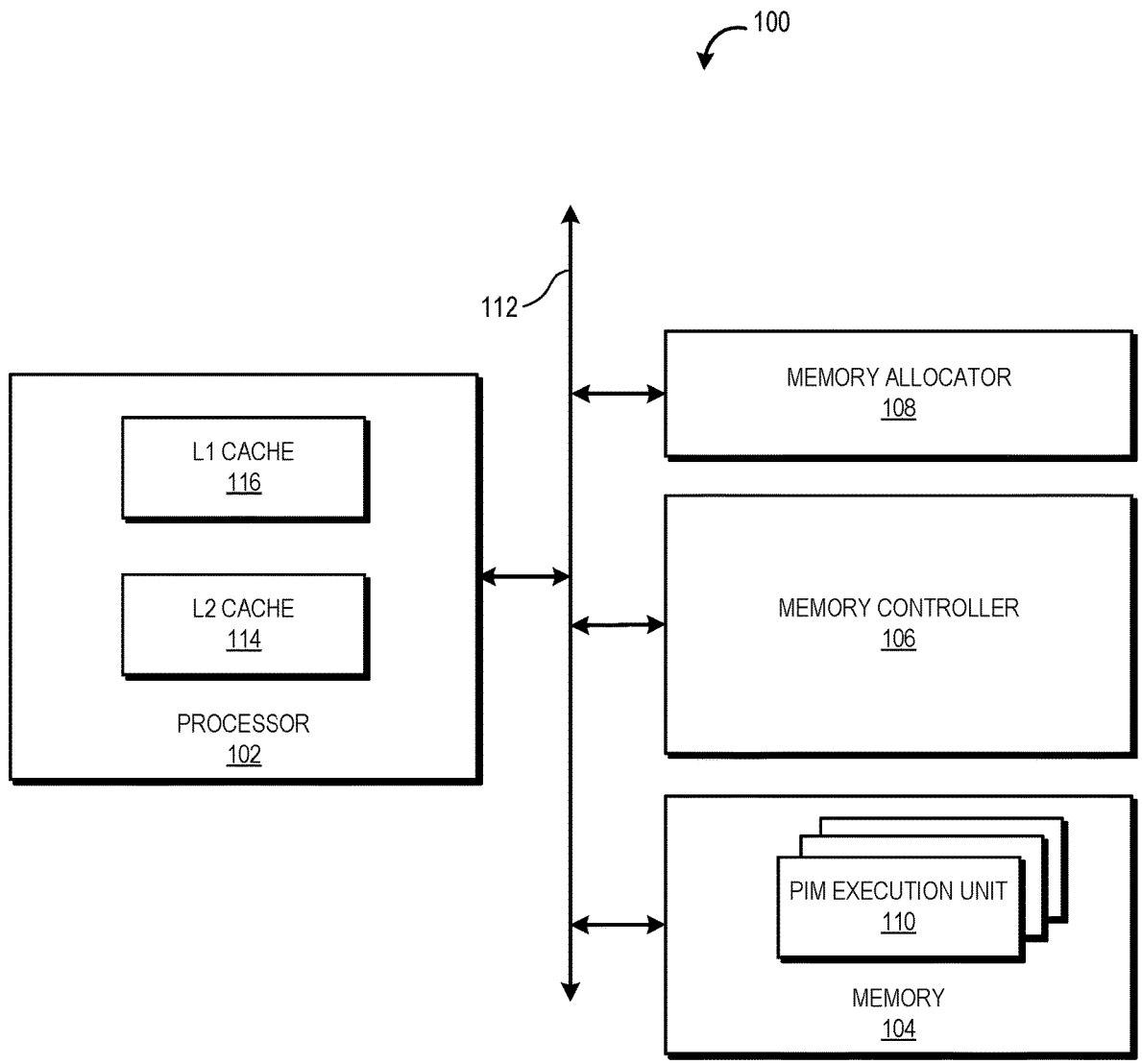
FIG. 1 is a block diagram of a processing system including a memory allocator to allocate data in memory for processing in memory execution units in accordance with some embodiments.

Processing in memory (PIM) performs computation near or in memory such that bandwidth on a data link between a processor and a memory is conserved and power consumption of the processor may be reduced. Typically, PIM involves an execution unit configured to interface with a group of one or more banks of a dynamic random access memory (DRAM) device. DRAM devices are typically composed of a number of ranks, each rank composed of a number of banks, and each bank composed of a matrix of bitcells arranged in rows and columns.

DRAM devices employ row buffers (at least one per bank) in which memory reads and writes take place. Accesses to a DRAM row that is different from the one in the row buffer requires closing the currently buffered or open row and activating the requested row, which is referred to as a row buffer conflict and incurs performance and energy penalties. DRAM row-buffer conflicts limit the optimal exploitation of the available memory bandwidth and increase the memory-access latencies due to closing and activating DRAM rows.

One way to avoid row-buffer conflicts is to access as many data elements as possible from a same row. However, there is no guarantee that the adjacent data elements which fall into the same operating system page or contiguous physical address space will always be accessed together. The placement of data elements inside physical memory modules, such as a particular DRAM channel, bank, row and column, depends on the physical address to physical memory mapping schemes employed by a memory controller that controls access to the DRAM. Further, unlike processors such as central processing units (CPUs) and parallel processors such as graphics processing units (GPU) that can access multiple channels of a DRAM device, each PIM execution unit can access only the banks to which it is local and is therefore unable to exploit high bank-level parallelism to achieve high memory bandwidth. Accordingly, the impact of row-buffer conflicts on PIM performance can be significant, as the row-switching overhead cannot be hidden by accessing multiple banks in parallel.

FIGS. 1-8 illustrate example techniques for improved processing efficiency in a processing system through co-locating input and output operands for operations for PIM execution in the same PIM-local memory while exploiting row-buffer locality and complying with conventional memory abstraction. The memory includes a PIM execution unit associated with (i.e., "local" to) a group of one or more banks. The processing system identifies a "super row", defined herein as a virtual row that spans all the banks of a memory device. Each super row has a different bank-interleaving pattern, referred to herein as a "color". A group of super rows that has the same PIM-interleaving pattern is referred to herein as a "color group". The processing system assigns memory addresses to the elements of each operand (e.g., vector) of an operation for PIM execution to a super row having a different color within the same color group to co-locate the operand elements for each PIM execution unit and uses address hashing to alternate between banks assigned to elements of a first operand and elements of a second operand of the operation.

For example, in some embodiments, the processing system sets a first bit of a row identification field of a memory address of an operand to indicate the color group of the memory address and sets a second bit of the row identification field of the memory address to indicate the color of the memory address. Thus, the colors (i.e., interleaving patterns) of the super rows are determined by the row ID bits (referred to herein as color bits) that indicate the channel and bank IDs. The processing system sets bits of an offset field of the memory address of the operand to indicate which element of the operand is located at which bank and row of the color group and color of the super row of the memory address. By setting the color group ID bits the same and the offset bits differently for operands that are included in the same PIM operation, the same color group ID ensures that the operands will be co-aligned within a PIM boundary and the different color offsets ensure that the operands have different interleaving patterns within the local banks of the PIM execution units.

In some cases, the operands of an operation are larger than a super row that spans all the banks of the memory. To accommodate large operands, the processing system allocates memory addresses to the large operands at contiguous super rows of different colors in some embodiments. If the color of the first super row allocated to an operand is the first color of a color group, the processing system allocates the remainder of the operand to the second color of the color group. Conversely, if the first super row allocated to the operand is the second color of the color group, the processing system allocates the remainder of the operand to the first color of the color group. In this way, the processing system alternates, or shuffles, the sequence of colors within a color group in response to the first operand being allocated to a memory address at a super row having a color that is not the first color in the color group. In some embodiments, the processing system uses address shuffling to implement the color sequencing by performing an XOR operation against array indices.

Although a memory can have a number of colors (interleaving patterns) equal to the number of banks, too many colors results in lower capacity per color, which can in turn result in extra data movement to cross the color boundary. Such additional data movement across color boundaries offsets the benefits of PIM acceleration. To exploit row-buffer locality for PIM, the processing system reduces the number of available colors in some embodiments to the number of banks per PIM execution unit by performing index shuffling in user space to change the color of the pages allocated by the memory allocator.

FIG. 1 illustrates a block diagram of a processing system 100 including a memory allocator for co-locating input and output operands for operations for PIM execution in the same PIM-local memory while exploiting row-buffer locality in accordance with some embodiments. The processing system 100 is generally configured to execute sets of instructions (e.g., programs) or commands (e.g., draw commands) to carry out tasks on behalf of an electronic device. Accordingly, in different embodiments the processing system 100 is incorporated into one of a variety of electronic devices, such as a desktop computer, laptop computer, server, smartphone, tablet, game console, and the like. To support execution of instructions, the processing system 100 includes a processor 102 such as a central processing unit (CPU) or parallel processor such as a graphics processing unit (GPU), a memory 104 including a plurality of PIM execution units 110, a memory controller 106, and a memory allocator 108. In some embodiments, the processing system 100 includes additional processing units (e.g., one or more additional CPUs or parallel processors), memory devices, or other supporting devices (e.g., one or more input/output (I/O) controllers), and the like, or any combination thereof.

The processor 102 is a processing unit generally configured to perform specified operations in response to received commands, such as commands received from a CPU in the case where the processor is a parallel processor. Examples of the types of operations performed by the processor 102 includes graphics operations (e.g., execution of draw commands and other graphics commands), vector operations, matrix operations, operations associated with machine learning, neural networks, artificial intelligence, and the like, or any combination thereof. In other embodiments, the processor 102 is a different type of processing unit or processor, such as a single instruction multiple data (SIMD) architecture processor, a single instruction multiple thread (SIMT) architecture processor, or another processor for performing tasks such as graphics, machine intelligence or compute operation tasks.

In some embodiments, the processor 102 is a core complex that includes multiple processor cores (not shown) (e.g., central processing unit (CPU) cores, graphical processing unit (GPU) cores, etc.) respectively coupled to second-level (L2) caches such as L2 cache 114. Further, each of the processor cores includes respective on-board primary (L1) caches such as L1 cache 116. Each of the processor cores includes various components of a processor pipeline (not depicted) such as an instruction fetch, decode, and dispatch pipeline, prefetch input queues, schedulers, load/store queues, lookaside buffers, reorder buffers, and retire queues as well as various arithmetic logic units (ALUs) and register files. The processor 102 may include any number of processor cores, as well as more or fewer caches. In some examples, the processor 102 is configured to execute multithreaded applications using the multiple processor cores.

Each of the L1 caches 116 and the L2 caches 114 includes cache logic that, in response to a processor request, determines whether data associated with a requested operation is present in a cache entry of the cache. If the data is present (a "cache hit"), the processor request is fulfilled using the data present in the cache entry. If the data is not present (a "cache miss"), the request is forwarded to the next-level cache until a cache miss is detected in the last level cache (LLC). In response to a cache miss in the LLC, the request is forwarded to the memory controller 106 of the processor 102 to fulfill the request using data stored in main memory (e.g., memory 104). In some cases, the processor requests are I/O operations, such as read/write requests, directed to a memory location in the memory 104.

The PIM execution units 110 are execution units incorporated into the memory 104 that are configured to perform relatively simple processing operations, such as arithmetic operations. To support processing of data, each PIM execution unit 110 includes one or more processing modules, such as an arithmetic logic unit (ALU), configured to execute specified processing operations on data stored at, or to be stored at, the memory 104. In some embodiments, the PIM execution units 110 are configured to execute discrete processing tasks, wherein the processing tasks are indicated by commands or other control signaling issued by the processor 102 or other processing unit, and the PIM execution units 110 are not able to carry out more general processing tasks such as those carried out by the processor 102, or other processing unit. For example, in some embodiments the PIM execution units 110 are configured to perform arithmetic operations, such as matrix multiplication, on received matrices, wherein the arithmetic operations are based on commands issued by the processor 102. However, the PIM execution units 110 are not able to carry out all of the operations of the processor 102 or are not able to execute similar operations as efficiently as the processor 102.

To support storage of data, the memory 104 includes a storage array. Some embodiments of the memory 115 are implemented as a dynamic random access memory (DRAM). However, the memory 115 can also be implemented using other types of memory including static random access memory (SRAM), nonvolatile RAM, and the like. In some embodiments, the storage array is an array of RAM bit cells, and the PIM execution units 110 are generally configured to respond to memory access requests (e.g., read requests and write requests) issued by the processor 102 or other processing unit by storing or retrieving data at the storage array of the memory 104.

The memory controller 106 applies an address hashing function for the memory 104 that XORs row ID bits with offset bits of a memory address of an operand to map elements with the same index to different banks of the memory 104. This avoids sequential accesses to the same bank and exploits bank-level parallelism.

To facilitate allocation of memory addresses for PIM such that the operands associated with the same operation are co-located in the same local memory of PIM execution units 110 while maximizing PIM memory bandwidth by exploiting DRAM row-buffer locality, the processing system 100 includes a memory allocator 108. The memory allocator 108 is a software layer that allocates memory addresses at a granularity of a super row that spans all banks of the memory 104 based on address mappings set by the memory controller 106. The memory allocator 108 assigns address bits to elements of operands of operations performed by PIM based on the address hashing function applied by the memory controller 106, as described in more detail below.

Figure 2:
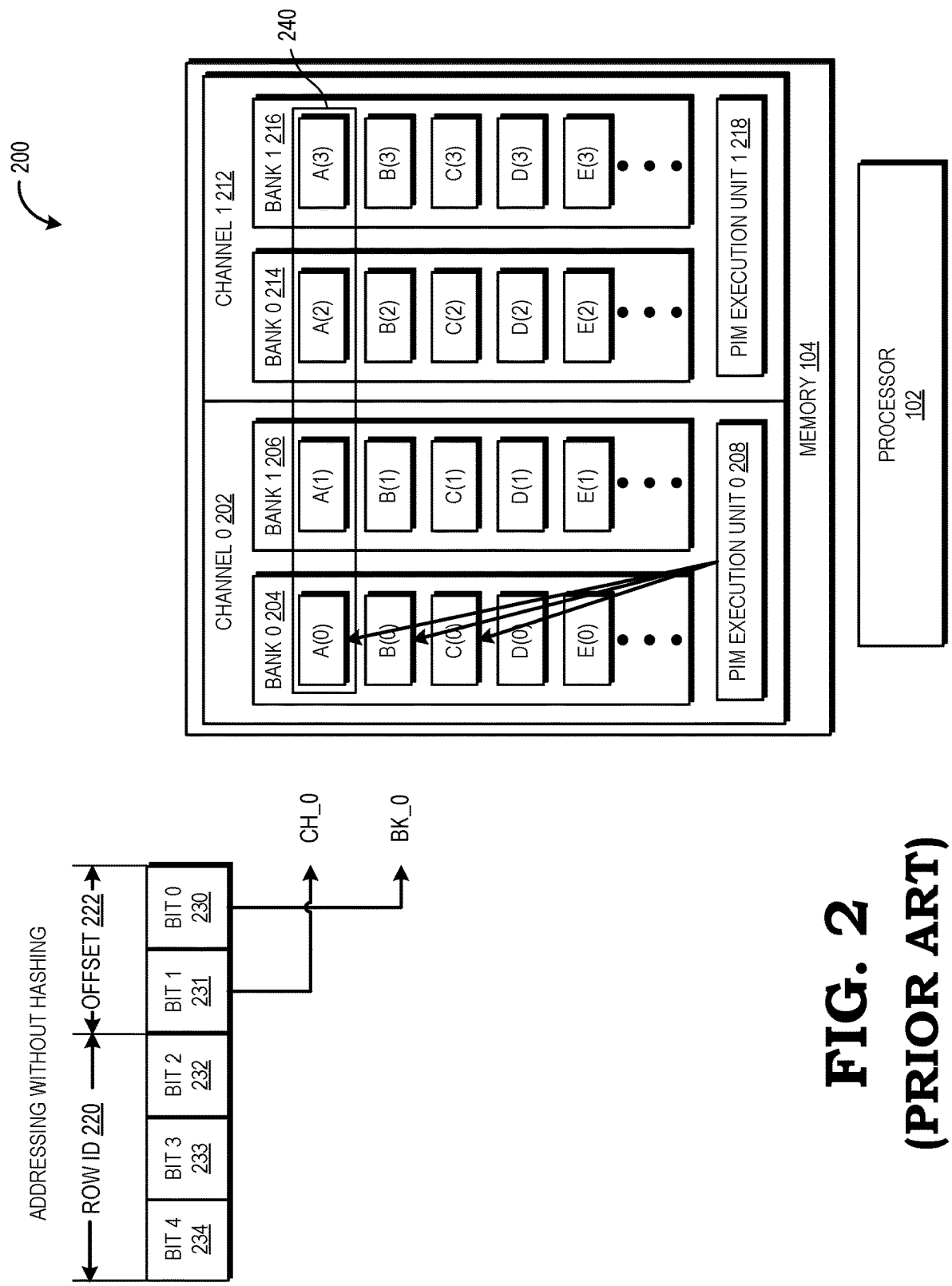
FIG. 2 is a block diagram of operand elements allocated to banks of a memory without address hashing.

FIG. 2 is a block diagram 200 of operand elements allocated to banks of the memory 104 without address hashing. In the illustrated example, the memory 104 includes two channels, channel 0 202 and channel 1 212. Each channel includes two banks—channel 0 202 includes bank 0 204 and bank 1 206, and channel 1 212 includes bank 0 214 and bank 1 216. Channel 0 202 is associated with PIM execution unit 0 208, such that PIM execution unit 0 208 can only access data stored at bank 0 204 and bank 1 206, and channel 1 212 is associated with PIM execution unit 1 218, such that PIM execution unit 1 218 can only access data stored at bank 0 214 and bank 1 216. In some embodiments, each PIM execution unit is associated with a group of banks that includes more than two banks. An operation that requires accessing data via both channel 0 202 and channel 1 212 is performed by the processor 102 is not amenable to PIM.

An address mapping for an operand includes five bits in the illustrated example (bit 0 230, bit 1 231, bit 2 232, bit 3 233, and bit 4 234), of which bit 0 230 and bit 1 231 designate an offset from the super row base ("offset") 222 and bit 2 232, bit 3 233, and bit 4 234 designate a super row ID 220. A program for PIM execution is $C(i)=A(i)+b(i)$ $E(i)=C(i)*D(i)$ The program has five data structures (A, B, C, D, and E) and the size of each structure is equal to the size of a virtual row that spans all the banks of the memory 104 (i.e., a super row 240) in the illustrated example. Without address hashing, the array of elements of each data structure (i.e., operand) that are accessed for each operation are located in the same bank of the same channel (e.g., A(0), B(0), and C(0) are all located in bank 0 204). Although each of the operands is accessible by PIM execution unit 0 208, and thus have data co-location, they require serialized access to the same bank and suffer from row-buffer conflicts that incur extra latency to close and open rows.

Figure 3:
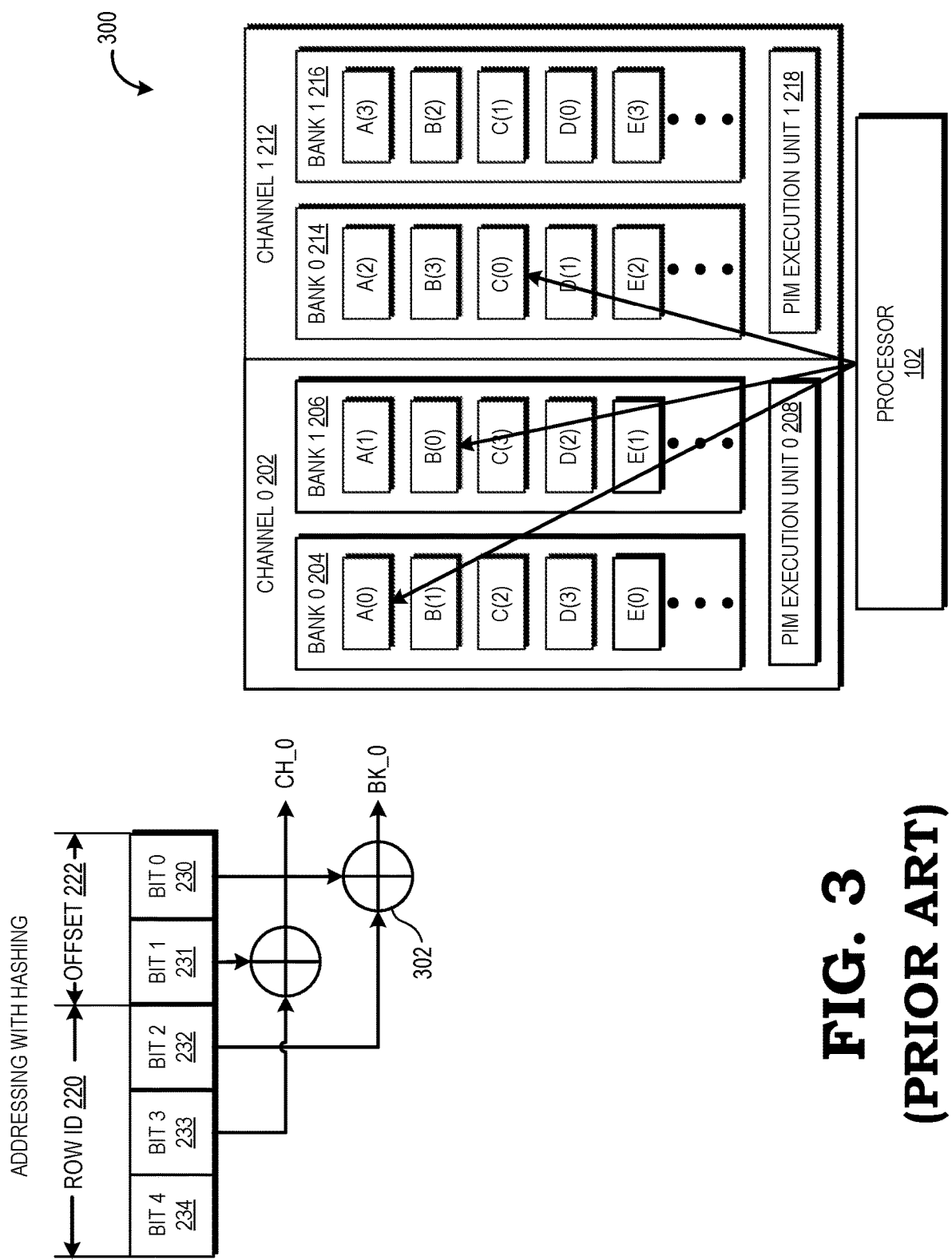
FIG. 3 is a block diagram of operand elements allocated to banks of a memory with address hashing.

FIG. 3 is a block diagram 300 of operand elements allocated to banks of the memory 104 with address hashing. The address mapping with hashing applies an XOR function 302 to a subset of row ID bits 220 (e.g., bit 2 232 and bit 3 233) and the offset 222 (bit 0 230 and bit 1 231), which determine the channel and bank IDs. By XORing these bits, the address hashing function ensures that super rows that have different bit 2 232 and bit 3 233 values follow different channel and bank interleaving patterns. Thus, in the illustrated example, A(0) is in bank 0 204, B(0) is in bank 1 206, and C(0) is in bank 0 214, eliminating row-buffer conflicts for the operation C(i)=A (i)+b. The processing system 100 can exploit bank-level parallelism due to the vector elements with the same index being mapped to different banks.

While the bank-level parallelism reduces latency, address hashing hinders co-locating operands for PIM execution. In the illustrated example, A and B are co-aligned and the elements with the same index are co-located in the local memory of PIM execution unit 0 208 (i.e., channel 0 202). However, the output operand C is not co-aligned within the same local memory of PIM execution unit 0 208 due to the different PIM-interleaving patterns. Consequently, vector addition and multiplication cannot be executed with PIM execution units 208, 218, but is instead performed by the processor 102, which is able to access both channel 0 202 and channel 1 212.

Figure 4:
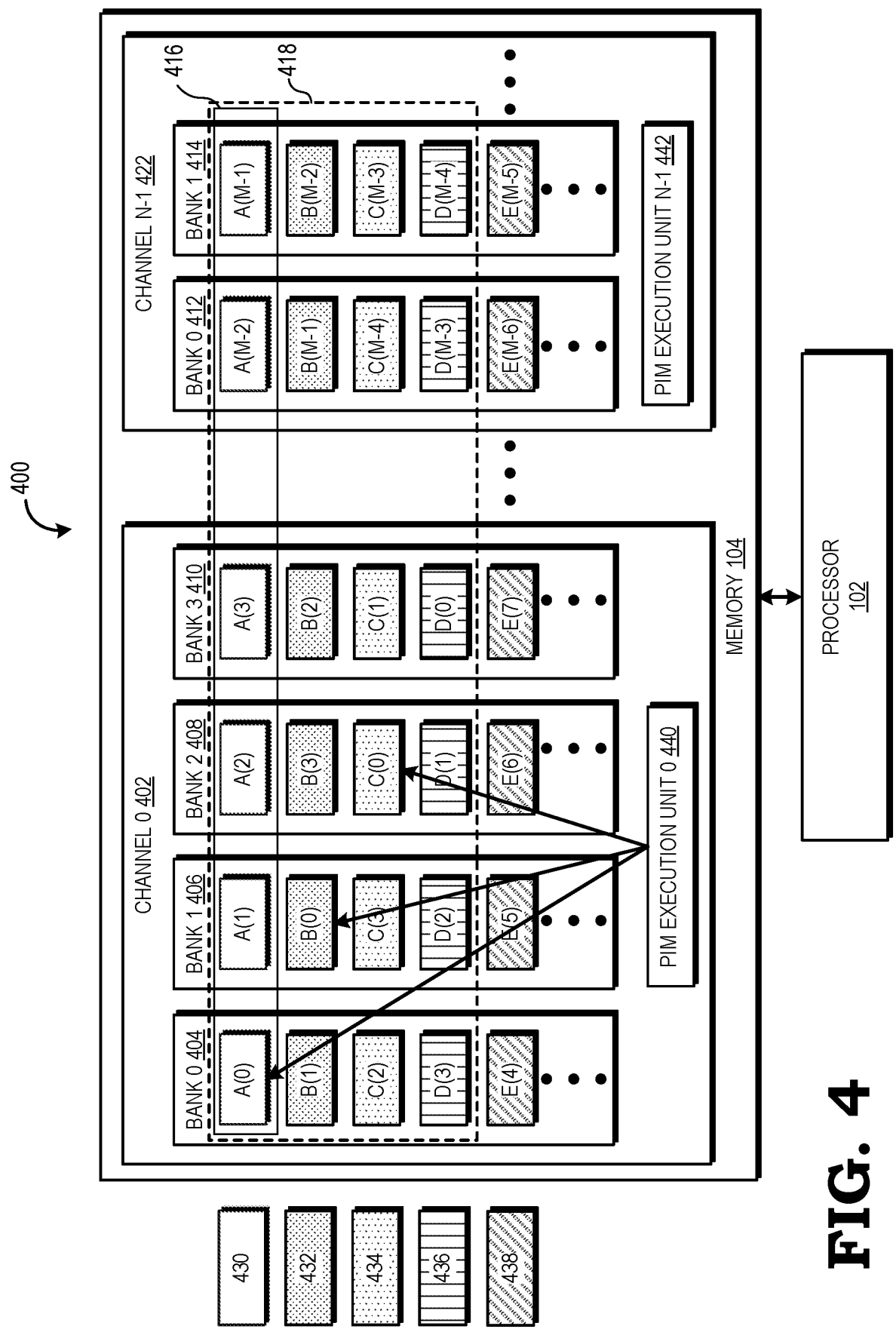
FIG. 4 is a block diagram of operand elements allocated to banks of a memory for data co-location and row-buffer locality in accordance with some embodiments.

FIG. 4 is a block diagram 400 of operand elements allocated to banks of a memory for data co-location and row-buffer locality in accordance with some embodiments. The memory allocator 108 assigns an interleaving pattern (color) to each virtual row spanning all the banks of the memory 104 (e.g., super row 416) and assigns two or more contiguous super rows to a color group such as color group 418. The memory allocator 108 assigns physical memory addresses to the operands A, B, C, D, and E by allocating each operand of an operation to be performed in PIM to a different color within a same color group and hashing the offset bits of the address so that the offset bits of the elements of each operand are different from each other. By assigning the operands to the same color group, the memory allocator 108 ensures that the operands are co-aligned within a PIM boundary (i.e., are located in banks accessible by a single PIM execution unit 110) and by assigning different color offsets to each of the operands in the operation, the memory allocator 108 ensures that the operands have different interleaving patterns within the local banks of the PIM execution unit 110. The memory allocator 108 thus achieves data co-location within PIM boundaries and high row-buffer locality at the same time without manual mapping.

In the illustrated example, the memory 104 includes N channels (channel 0 402, . . . , channel N 422) and M banks (bank 0 404, bank 1 406, bank 2 408, and bank 3 410, which are local to PIM execution unit 0 440, and bank 0 412 and bank 1 414, . . . , which are local to PIM execution unit N 422), where M=4N (i.e., there are four banks per channel). Thus, in the illustrated example, each PIM execution unit corresponds to four banks. Each of the operands A, B, C, D, E has as many arrays of elements as there are banks in the memory 104, such that each operand is the size of a super row 416.

The memory allocator 108 assigns each operand of an operation (e.g., C(i)=A(i)+b(i)) to a super row within a common color group. For example, the first super row 416 is assigned the color blue, represented by block 430. The second super row is assigned the color orange, represented by block 432. The third super row is assigned the color green, represented by block 434, and the fourth super row is assigned the color yellow, represented by block 436. The fifth super row 438 is assigned the color purple, and the sixth, seventh, and eighth super rows (not shown) are each assigned additional colors. In some embodiments, once all available colors have been assigned, the next super row reverts back to the first color (blue, in this case) and the pattern continues. As such, blocks 430, 432, 434, and 436 are also referred to herein as "blue 430", "orange 432", "green 434", "yellow 436", and "purple 438", respectively. The first color group 418 includes blue, orange, green, and yellow super rows, and the second color group includes purple and the next three colors of super rows.

Thus, the memory allocator 108 assigns operand A to blue 430, operand B to orange 432, and operand C to green 434. All three operands are within the same color group 418 and have alternating colors. With the assigned colors and color groups, the base addresses of the operands A, B, and C are aligned such that they are co-located within the local memory of PIM execution unit 0 440. Such alignment is automatic for element-wise operations such as vector-vector addition because the offset is the same for the elements with the same indices. For example, the address offsets of A(0) and B(0) are the same, A(1) and B(1) are the same, etc. If the base addresses of A and B are aligned, the parity of address bits that determine (CH_0) is the same between A and B because the offsets are the same. Therefore, if two super rows 416 belong to the same color group 418, elements laid out in the super rows will be co-aligned within the super row boundary.

Figure 5:
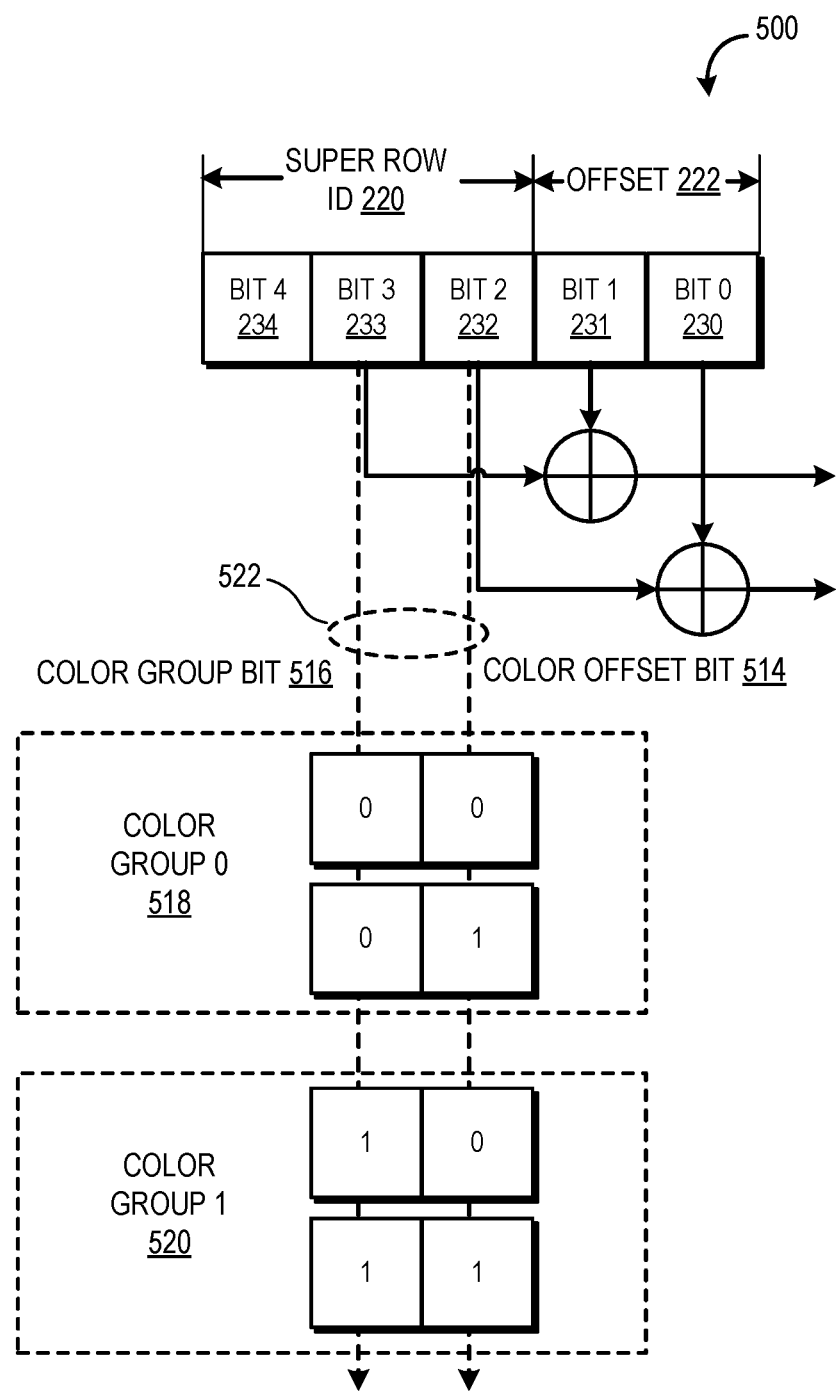
FIG. 5 is a block diagram of address hashing to assign operands to colors and color groups for data co-location and row-buffer locality in accordance with some embodiments.

FIG. 5 is a block diagram 500 of address hashing to assign operands to colors and color groups for data co-location and row-buffer locality in accordance with some embodiments. Similar to the address illustrated in FIGS. 2 and 3, the address of an operand includes an offset 222 portion including bit 0 230 and bit 1 231 and a super row ID 220 portion including bit 2 232, bit 3 233, and bit 4 234. In the illustrated example, bit 2 232 and bit 3 233 are color bits 522 that indicate the color and color group of the super row to which the address is mapped. Bit 3 233 is a color group bit 516 that indicates the color group of the super row and bit 2 232 is a color offset bit 514 that indicates the color of the super row. The row bits that affect the PIM ID bits (e.g., CH_0) are color group bits and the row bits that affect the PIM-local bank ID bits are color-offset bits. Thus, if bit 3 233 is set to 0, the super row to which the operand is mapped is in color group 0 518 and if bit 3 233 is set to 1, the super row to which the operand is mapped is in color group 1 520. If bit 2 232 is set to 0, the super row to which the operand is mapped is color 0 of the mapped color group and if bit 2 232 is set to 1, the super row to which the operand is mapped is color 1 of the mapped color group.

In some embodiments, the memory allocator 108 is an operating system (OS) memory allocator that can support color grouping. When an application executing at the processing system 100 specifies the color of each data structure (e.g., auto X=pim_malloc(X_SIZE, PageColor:: BLUE)), the memory allocator 108 sets the color bits 522 to the desired value (i.e., color) if the color bits fall into the physical frame number (PFN) field. If the size of the data structure (i.e., operand or vector) exceeds the size of a super row, some of the color bits 522 may fall into the page offset 222 field of the address. In that case, the memory allocator 108 applies a hierarchical memory allocation in some embodiments. First, the OS memory allocator 108 colors the bits in the PFN field and then a user-level memory allocator partitions the data structure into a super row granularity and sets the rest of the color bits that fall into the super-row offset 222 field.

In some embodiments, the memory allocator 108 conducts coloring in user space without changing the OS. In response to a memory allocation request from a user program, the user-space memory allocator 108 requests huge pages from the OS. Each of the huge pages returned by the OS contains frames with multiple colors. The user-space memory allocator 108 manages the frames with different colors and color groups and supports color grouping in diverse platforms without any OS changes.

Figure 6:
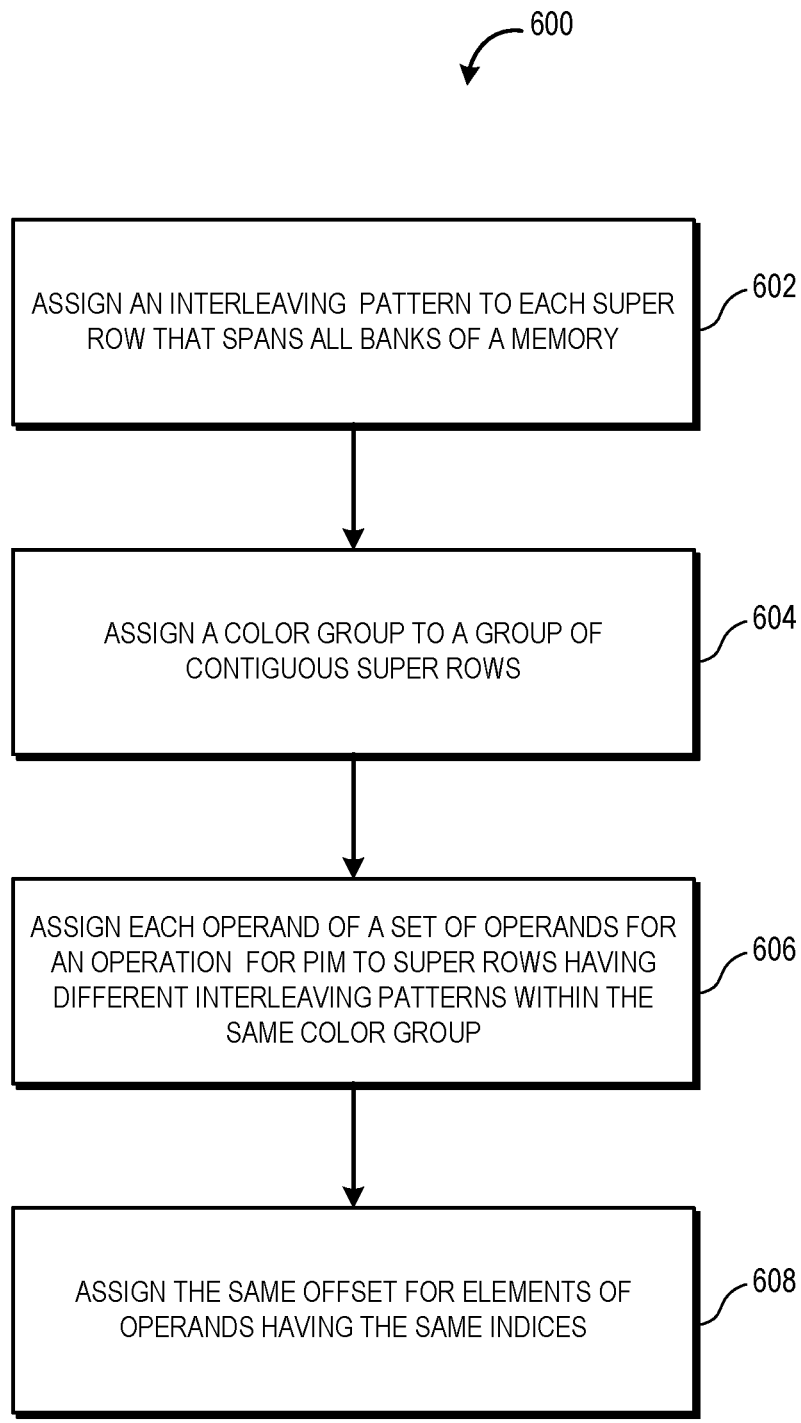
FIG. 6 is a flow diagram illustrating a method for allocating operands for data co-location and row-buffer locality in accordance with some embodiments.

FIG. 6 is a flow diagram illustrating a method 600 for allocating operands for data co-location and row-buffer locality in accordance with some embodiments. In some embodiments, the method 600 is implemented by a memory allocator 108 as depicted in FIG. 1.

At block 602, the memory allocator 108 assigns an interleaving pattern (i.e., color) to each super row spanning all banks of the memory 104. For example, the memory allocator assigns color blue 430 to the first super row 402, color orange 432 to the second super row, color green 434 to the third super row, and color yellow 436 to the fourth super row, and then repeats the pattern of colors for subsequent super rows.

At block 604, the memory allocator 108 assigns a color group to a group of two or more contiguous super rows. For example, the memory allocator 108 assigns the blue 430 and orange 432 super rows to a first color group 404 and assigns the green 434 and yellow 436 super rows to a second color group.

At block 606, the memory allocator 108 assigns each operand of a set of operands for an operation for PIM to super rows having different colors that are within the same color group. Thus, for an example operation C(i)=A (i)+b (i)), the memory allocator 108 assigns each of A, B, and C to the same color group and assigns A and B to different colors within the color group.

At block 608, the memory allocator 108 hashes the addresses of the operands to assign the same offset for elements of operands having the same indices. Thus, the operands are co-located within a same local memory for a PIM execution unit 110 and alternate between banks of the local memory to reduce row-buffer conflicts.

Figure 7:
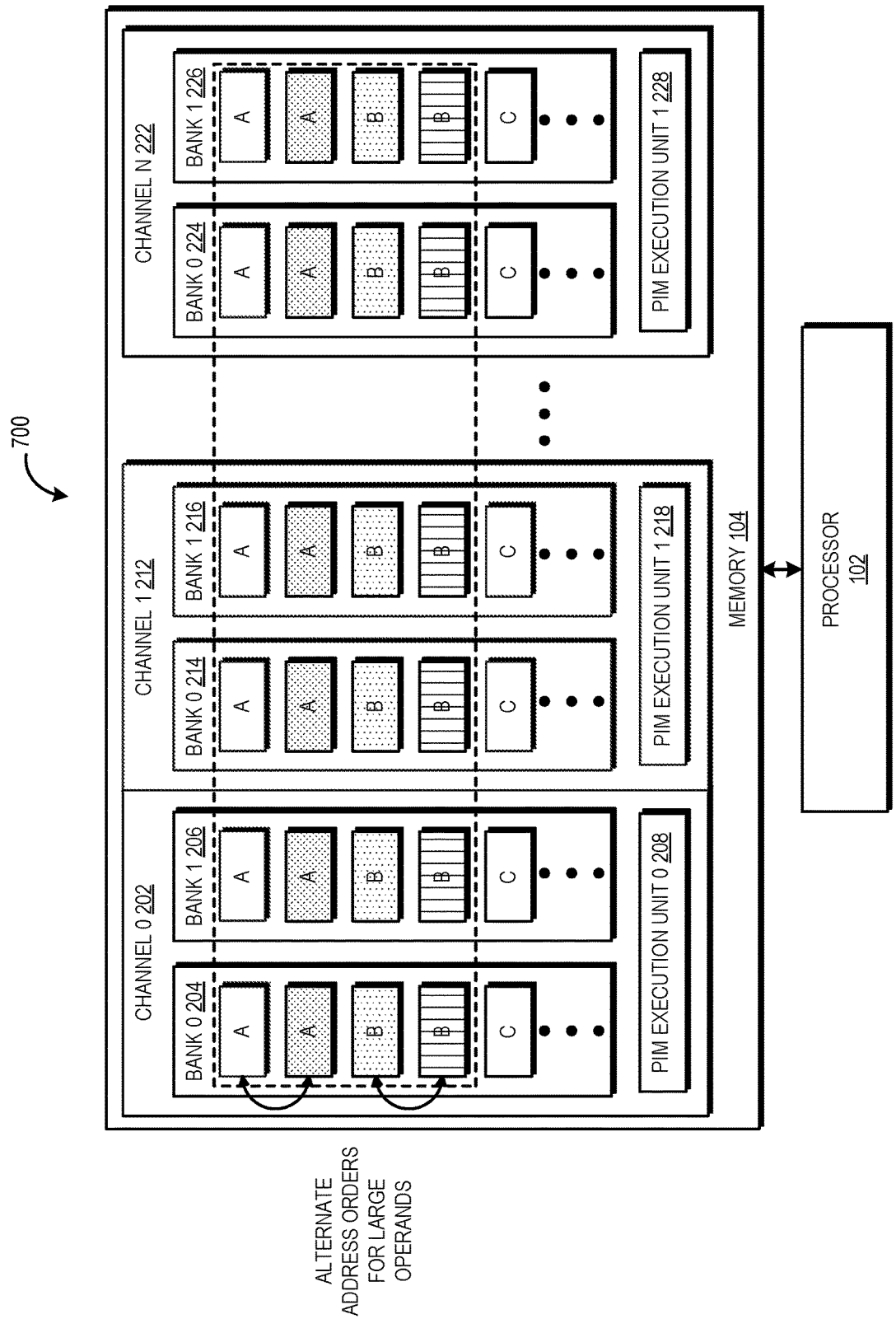
FIG. 7 is a block diagram of data allocation for a data structure that exceeds the size of a row spanning all banks of a memory in accordance with some embodiments.

FIG. 7 is a block diagram 700 of data allocation for a data structure that exceeds the size of a super row in accordance with some embodiments. If an operand exceeds the size of a super row, the color of the operand could be unclear. In some embodiments, the memory allocator 108 allocates multiple super rows of the same color to the large operand. However, some operands may even exceed the available capacity for some colors.

To relax the capacity requirement for one color, in some embodiments, the memory allocator 108 uses a predetermined color sequence when allocating memory for large operands. For example, if the color of the first super row allocated to a large operand (referred to herein as the representative color of the large operand) is the first color of a color group (e.g., blue 430), the memory allocator 108 allocates contiguous super rows to the large operand (e.g., blue 430, then orange 432, then green 434, then yellow 436, and back to blue 430, etc.). However, if the representative color of the large operand is the second color of the color group (e.g., orange 432), the memory allocator shuffles the address such that the color sequence becomes orange 432, then blue 430, then yellow 436, then green 434, and back to orange 432, etc. The memory allocator 108 thus assigns large operands associated with a PIM operation to different colors from the same color group of all the elements of the large operands.

The memory allocator 108 implements the color sequencing by using address shuffling, for example, by performing an XOR operation against array indices. When assigning a target address based on the color of the operand and the element index, the memory allocator 108 XORs the index bits that correspond to super row ID bits 220 with the color bits 522 (e.g., the color group bit 516 and the color offset bit 514). For example, to shuffle the address for a large operand with a representative color orange 432, the memory allocator 108 calculates the super row ID 220 as follows: bit 3 233 is 0 and bit 2 232 is 1, where 0, 1 are the color bits 522 of the orange 432 super row. The large operand's index bits that correspond to {bit 4 234, bit 3 233, bit 2 232} increment as {0,0,0}, {0,0,1}, {0,1,0}, {0,1,1}, etc., and the address shuffling results in {0,0,1}, {0,0,0}, {0,1,1}, {0,1,0}, etc. To shuffle the address for a large operand with a representative color green 434, the memory allocator 108 calculates the super row ID 220 as follows: bit 3 233 is 1 and bit 2 232 is 0, where 1, 0 are the color bits 522 of the green 434 super row. By shuffling addresses, the memory allocator 108 simplifies memory allocation. In some embodiments, the memory allocator 108 only guarantees the contiguity of super rows and the desired color sequence is flexibly controlled at the user program by modifying the array-index "[ ]" operator.

Although the memory 104 could theoretically have up to N colors, where N is the number of banks in the memory 104, having too many colors results in less capacity per color, which can lead to more data movement to cross the color boundary and offset the benefit of PIM acceleration. To efficiently exploit row-buffer locality, the memory allocator 108 can allocate as few as x colors, where x is the number of banks per PIM execution unit 110. In some embodiments, the memory allocator 108 performs index shuffling in user space to reduce the number of colors and have higher capacity per color. Index shuffling in user space has the effect of changing the color of the memory pages allocated by the memory allocator 108. For example, if an allocated memory page is green 434 but the memory page is required to be orange 432 for co-location and row-buffer locality, the memory allocator 108 overrides the array-index "[ ]" operator to shuffle addresses such that the green memory page follows the indexing scheme of an orange memory page.

The memory allocator 108 changes the memory page color from green 434 to orange 432 in some embodiments by toggling the color group bit 516 and the color offset bit 514 (e.g., color group 1→0, color offset 0→1) as follows: bit 3 233^1 to toggle the color group bit 516, bit 2 232^1 to toggle the color offset bit 514. Because bit 3 233 and bit 2 232 are part of the physical frame number, to perform the toggling in user space, in some embodiments the memory allocator 108 shuffles the offset field of the virtual address in user space as follows: bit 1 231^1, bit 0 230^1. The memory allocator 108 is thus XORing the lower-order address bits that affect the PIM execution unit 110 ID bits, which has the same effect as toggling the color group bit 516 and the color offset bit 514 because CH_0=(bit 3 233^1)^bit 1 231=bit 3 233^(bit 1 231^1)

BK_0=(bit 2 232^1)^bit 0 230=bit 2 232^(bit 0 230^1).

The shuffling results in C(2) being mapped to where C(1) is, C(3) being mapped to where C(0) is, C(0) being mapped to where C(3) is, and C(1) being mapped to where C(2) is, which is the same interleaving pattern (1→0→3→2) as the orange 432 memory page.

Figure 8:
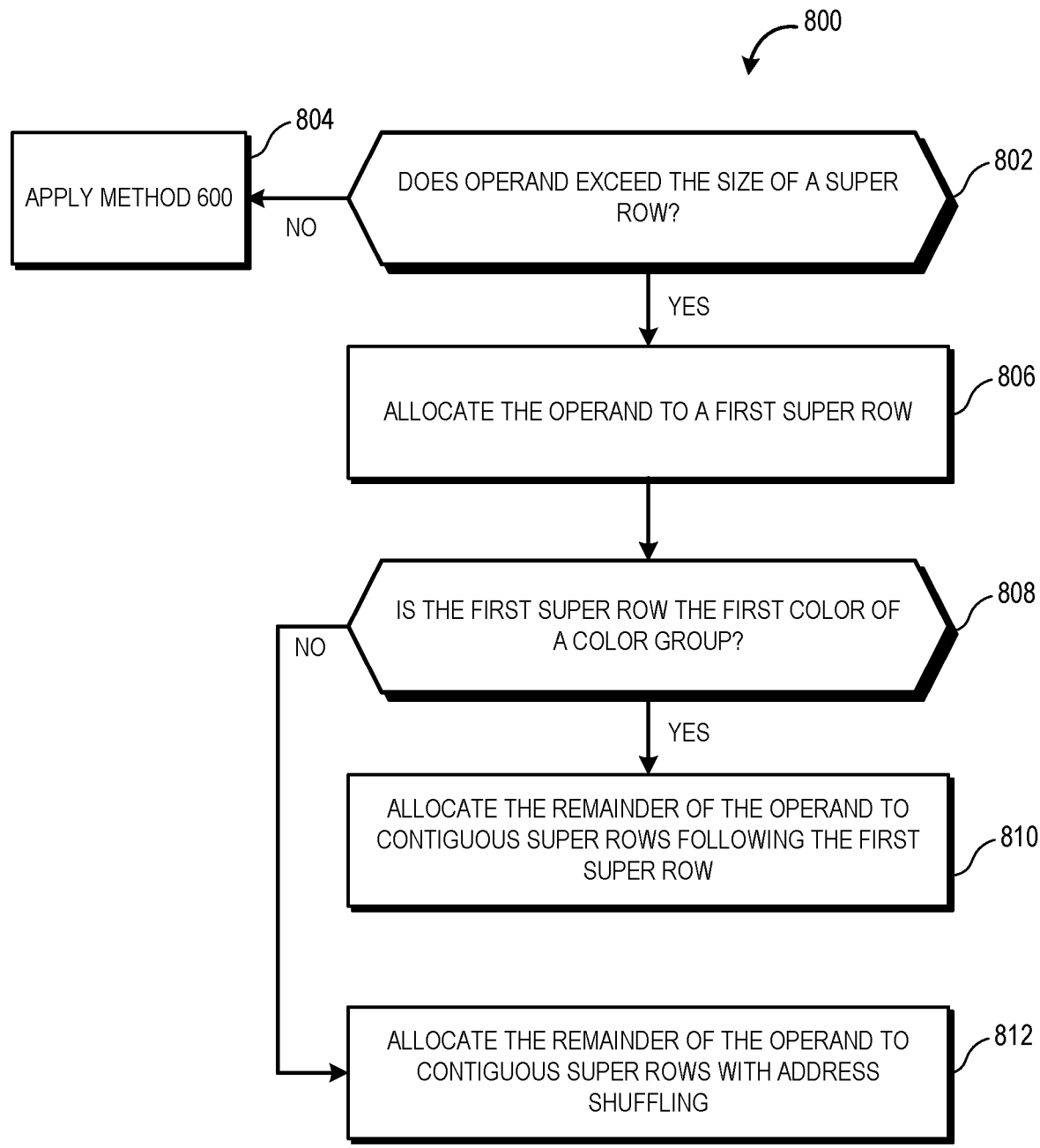
FIG. 8 is a flow diagram illustrating a method for allocating operands for data co-location and row-buffer locality for large data structures in accordance with some embodiments.

FIG. 8 is a flow diagram illustrating a method 800 for allocating operands for data co-location and row-buffer locality for large operands in accordance with some embodiments. In some embodiments, the method 800 is implemented by a memory allocator 108 as depicted in FIG. 1.

At block 802, the memory allocator 108 determines whether the operands of an operation exceed the size of a super row. If the operands do not exceed the size of a super row, the method flow continues to block 804 and the memory allocator 108 applies the method 600 of FIG. 6.

If, at block 802, the memory allocator 108 determines that the operands of the operation exceed the size a super row, the method flow continues to block 806. At block 806 the memory allocator 108 allocates an operand to a first super row. At block 808, the memory allocator 108 determines whether the first super row is the first color of a color group (e.g., whether the first super row is blue, in a blue-orange color group). If, at block 808, the memory allocator 108 determines that the first super row is the first color of the color group, the method flow continues to block 810.

At block 810, the memory allocator 108 allocates the remaining elements of the operand (i.e., the elements of the operand that did not fit within the first super row) to contiguous super rows following the first super row. For example, if the operand spans four super rows, the first super row to which the operand is allocated is Hue, and the order of the super rows is blue, orange, green, yellow, the memory allocator 108 allocates the operand to the Hue, orange, green, and yellow super rows, in that order.

If, at block 808, the memory allocator determines that the first super row is not the first color of the color group, the method flow continues to block 812. At block 812, the memory allocator 108 allocates the remainder of the operand to contiguous super rows with address hashing, such that the allocation order toggles between super rows of each color group. For example, if the first super row to which the operand is allocated is orange, and the order of the super rows is blue, orange, green, yellow, the memory allocator 108 allocates the operand to the orange, blue, yellow, green super rows, in that order.

In some embodiments, the apparatus and techniques described above are implemented in a system including one or more integrated circuit (IC) devices (also referred to as integrated circuit packages or microchips), such as the processing system described above with reference to FIGS. 1-8. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A processing system, comprising:
   a plurality of processing in memory (PIM) execution units configured to interface with a memory that has a plurality of banks, wherein each PIM execution unit corresponds to a group of banks; and
   a processor configured to:
      assign an interleaving pattern to each super row of the memory, wherein each super row is a virtual row that spans all the banks of the memory; and
      allocate memory addresses to a set of operands for an operation performed by a first PIM execution unit, wherein each operand is assigned to a super row having a different interleaving pattern and all the operands in the set are allocated to super rows in a same color group.

2. The processing system of claim 1, wherein the processor is to assign the set of operands to the group of banks associated with the first execution unit.

3. The processing system of claim 2, wherein each operand comprises a plurality of elements, and wherein the processor is to hash the memory addresses to map elements of the operands with a same index to different banks of the memory.

4. The processing system of claim 1, wherein the processor is to configure a row identification field of a memory address of an operand to indicate the color group that includes the super row of the operand and to indicate the bank interleaving pattern of the super row of the operand.

5. The processing system of claim 4, wherein the processor is to configure an offset field of the memory address of the operand to indicate which element of the operand is located at which bank and row of the color group and the bank interleaving pattern of the super row of the operand.

6. The processing system of claim 1, wherein the memory processor is to allocate an operand to two or more contiguous super rows in response to the operand exceeding a size of a super row.

7. A processing system, comprising:
   a plurality of processing in memory (PIM) execution units configured to interface with a memory that has a plurality of banks, wherein each PIM execution unit corresponds to a group of banks; and
   a processor configured to:
      assign an interleaving pattern to each super row of the memory, wherein each super row is a virtual row that spans all the banks of the memory; and
      allocate memory addresses to a set of operands for an operation performed by a first PIM execution unit, wherein each operand is assigned to a super row having a different interleaving pattern and all the operands in the set are allocated to super rows in a same color group.

8. The processing system of claim 7, wherein the processor is to assign the set of operands to the group of banks associated with the first PIM execution unit.

9. The method of claim 8, wherein each operand comprises a plurality of elements, and wherein allocating the memory addresses comprises hashing the memory addresses to map elements of the operands with a same index to different banks of the memory.

10. The processing system of claim 7, wherein the processor is to configure a row identification field of a memory address of an operand to indicate the color group that includes the super row of the operand and to indicate the interleaving pattern of the super row of the operand.

11. The processing system of claim 10, wherein the processor is to configure an offset field of the memory address of the operand to indicate which element of the operand is located at which bank and row of the color group and the interleaving pattern of the super row of the operand.

12. The method of claim 7, further comprising wherein allocating the memory addresses comprises:
in response to an operand exceeding a size of a super row, allocating the operand to two or more contiguous super rows within the group of super rows.

13. The method of claim 12, further comprising:
alternating a sequence of the interleaving patterns of the two or more contiguous super rows within the group of super rows in response to the operand being allocated to a super row having an interleaving pattern that is not a first interleaving pattern in the group of super rows.

14. The method of claim 13, wherein allocating the memory addresses comprises assigning the set of operands to the group of banks associated with the first PIM execution unit.

15. The method of claim 14, wherein mapping the first vector and the second vector comprises assigning the first vector and the second vector to the group of banks associated with the first PIM execution unit.

16. The method of claim 15, wherein assigning the first vector and the second vector comprises hashing memory addresses assigned to the first vector and the second vector to map elements of the first vector and the second vector with a same index to different banks of the memory.

17. The method of claim 14, further comprising configuring a row identification field of a memory address of the first vector to indicate the first group of super rows that includes the first super row and to indicate the first interleaving pattern of the first super row.

18. The method of claim 13, wherein allocating the memory addresses comprises:
in response to an operand exceeding a size of a super row, allocating the operand to two or more contiguous super rows within the group of super rows.

19. The method of claim 14, further comprising:
allocating to the first vector to a first plurality of contiguous super rows in the first group of super rows in response to the first vector exceeding a size of the first super row.

20. The method of claim 19, further comprising:
alternating a sequence of interleaving patterns within the first group of super rows in response to a first super row of the first plurality of contiguous super rows having an interleaving pattern that is not the first interleaving pattern in the first group of super rows.

* * * * *